United States Patent

Boffito et al.

[11] Patent Number: 5,976,723
[45] Date of Patent: Nov. 2, 1999

[54] GETTER MATERIALS FOR CRACKING AMMONIA

[76] Inventors: Claudio Boffito, Via Giovanni XXIII 2, Rho, 20017 Milan, Italy; John D. Baker, 329 N. 500 West, Blackfoot, Id. 83221

[21] Appl. No.: 08/924,425

[22] Filed: Aug. 27, 1997

Related U.S. Application Data

[63] Continuation of application No. 08/818,401, Mar. 12, 1997, abandoned.
[51] Int. Cl.[6] .............. C01B 3/04; F02B 43/08; H01M 8/04; H01M 8/18
[52] U.S. Cl. .............. 429/17; 123/3; 423/351; 423/658.2; 429/19; 429/20
[58] Field of Search .............. 123/1 A, 3; 429/19, 429/17, 20; 423/351, 658.2

[56] References Cited

U.S. PATENT DOCUMENTS

| | | |
|---|---|---|
| 3,201,901 | 8/1965 | Pauli . |
| 3,584,253 | 6/1971 | Wintzer ................................ 313/180 |
| 4,478,177 | 10/1984 | Valdespino ............................ 123/1 A |
| 4,704,267 | 11/1987 | DiMartino .............................. 423/351 |
| 4,750,453 | 6/1988 | Valdespino ............................ 123/1 A |
| 5,055,282 | 10/1991 | Shikada et al. . |

FOREIGN PATENT DOCUMENTS 2117319 of 0000 Canada .

OTHER PUBLICATIONS

V.P. Georgiev, et al., "Properties and Structure of a Catalyst for Dissociation of Ammonia", Poroshkovaga Nelallugia v.7 1989. Plenum Publishing Corporation, 1989.

J.D. Baker, et al., "Tritium purification via zirconium–manganese–iron alloy getter St 909 in flow processes", J. Vac. Sci. Technol. A 12(2), Mar./Apr. 1994, american Vacuum Society, 1994.

Theodore A. Brabbs, "Catalytic Decomposition of Methanol for Onboard Hydrogen Generation", NASA technical Paper 1247, Jun. 1976.

*Primary Examiner*—Wayne Langel
*Attorney, Agent, or Firm*—Hickman Stephens & Coleman

[57] ABSTRACT

A method is provided for cracking ammonia to produce hydrogen. The method includes the steps of passing ammonia over an ammonia-cracking catalyst which is an alloy including (1) alloys having the general formula $Zr_{1-x}Ti_xM_1M_2$, wherein $M_1$ and $M_2$ are selected independently from the group consisting of Cr, Mn, Fe, Co, and Ni, and x is between about 0.0 and about 1.0 inclusive; and between about 20% and about 50% Al by weight. In another aspect, the method of the invention is used to provide methods for operating hydrogen-fueled internal combustion engines and hydrogen fuel cells. In still another aspect, the present invention provides a hydrogen-fueled internal combustion engine and a hydrogen fuel cell including the above-described ammonia-cracking catalyst.

50 Claims, 5 Drawing Sheets

GETTER MATERIALS FOR CRACKING AMMONIA

This application is a continuation of Ser. No. 08/818,401 filed Mar. 12, 1997, now abandoned.

BACKGROUND OF THE INVENTION

1. The Field of the Invention

The present invention relates to the production of hydrogen gas. More particularly, the present invention provides methods, materials, and apparatus for the production of hydrogen gas from ammonia. In one aspect, the hydrogen released from the ammonia is used as a fuel.

2. The Relevant Art

The efforts made by the U.S. and other industrialized countries at controlling polluting emissions over the past thirty years have greatly reduced the amounts of air-borne pollutants that have been linked with serious environmental and heath risks. In the United States, for example, most urban areas have markedly improved air quality than even a decade ago on average. Nevertheless, much needs to be done to reduce still further the harmful chemicals pumped into the atmosphere from our combustion-driven economy. Indeed, one of the main goals of the automotive industry is the development of low-emission engine technology for vehicles having reduced, or even null, environmental impact. California, for example, will soon require that at least 2% of the vehicles sold in that state produce no polluting emissions.

Meeting these challenges is an extremely difficult proposition. All present vehicles use internal combustion engines (ICEs), in which the explosive reaction of a mixture of a fuel (typically a hydrocarbon ($C_nH_{2n+2}$)) and air (principally a mixture of nitrogen and oxygen) is exploited to produce the energy required for vehicle propulsion. However, the combustion of hydrocarbons in air generates various polluting gases, including carbon monoxide (CO), carbon dioxide ($CO_2$), ozone ($O_3$), nitrogen and sulfur oxides (i.e., $NO_x$ and $SO_x$), aldehydes, hydrocarbons, and lead compounds (Greenwood and Earnshaw 1984). $CO_2$ has achieved notoriety as a "greenhouse gas" for its ability to trap infrared radiation and thus prevent the release of heat from the Earth's atmosphere. Ozone has been linked with respiratory ailments and is a strong oxidant, thus contributing to property damage from air pollutants. The nitrogen and sulfur oxides have been implicated in acid rain, a major environmental concern, as well as property damage resulting from the formation of nitrogen and sulfur acids upon contact with water ($H_2O$) in the atmosphere. The nitrogen and sulfur acids are of especial concern to European nations as acid rain has been implicated in the destruction of such well known ancient structures as the Coliseum in Rome and the Parthenon in Athens. The remaining gases have been linked to a variety of health concerns, especially lead, which has been linked to brain damage.

A number of possible replacements to hydrocarbons fuels are under study. Among the various solutions considered, hydrogen ($H_2$) appears to be a very promising alternative for a number of reasons. Use of hydrogen fuels in ICEs would require only minor modifications to existing engine designs. The combustion of hydrogen in air yields water, which, of course, poses no significant environmental problem, and produces a relatively large amount of energy. In alternative propulsion technologies, such as electric vehicles, hydrogen can be used in fuel cells where it combines with atmospheric oxygen in a more controlled way than combustion through an electrochemical reaction. Electric energy generated by the fuel cell can either be stored in batteries or used directly to feed an electric motor to power the electric vehicle. In this latter case, the efficiency is much higher than in ICEs, approaching values of about 90% compared to values of about 30% which are typical for ICEs. Although fuel cell driven engines still need to be optimized before they can be exploited on an industrial scale, they are expected eventually to gain a significant role in transportation technology. One problem with hydrogen, however, is its safe handing: Hydrogen reacts explosively with air. As a consequence the use of hydrogen as a fuel for wide-spread distribution, in either its gaseous or liquid form (which would also require expensive refrigeration), poses numerous safety, technical, and economic problems that make its use as a fuel prohibitively difficult.

One approach to resolving the drawbacks of hydrogen as a fuel includes considering less expensive, simpler, and cheaper materials that can act as hydrogen carriers. Ammonia ($NH_3$) has been identified as a suitable hydrogen carrier: Ammonia is essentially non flammable and is readily obtained and handled in liquid form without the need for expensive and complicated refrigeration technology. In addition, ammonia contains about 1.7 times as much hydrogen as liquid hydrogen for a given volume in its liquid form; thus allowing for more efficient transportation of hydrogen fuel. Ammonia can be disproportionated into hydrogen and nitrogen ($N_2$) in a suitable separation unit upstream of the engine according to the reaction:

$$2NH_3 \rightarrow 3H_2 + N_2.$$

The nitrogen can be released to the atmosphere without significant environmental impact. Ammonia can be present in the hydrogen/oxygen fuel mixture in low amounts, up to about 5% by volume of the fuel mixture, without significantly affecting the combustion of hydrogen. In fact, while pure ammonia burns with difficulty in air, it burns easily when mixed to hydrogen. Thus, the dissociation yield of the unit need not be 100%. Furthermore, ammonia has a significant vapor pressure (approximately 100 pounds per square inch (psi) at 27° C.).

The use of ammonia as a storage medium for hydrogen fuel has been disclosed, for example, in U.S. Pat. Nos. 4,478,177 and 4,750,453, both assigned to Valdespino and incorporated herein by reference for all purposes. These patents describe an ICE fueled by hydrogen that is obtained through disproportionation of ammonia in a separation chamber. The ammonia separation unit is a chamber containing a catalyst that is taught to be one or more metals including iron (Fe), nickel (Ni), osmium (Os), zinc (Zn), and uranium (U). These metals are well known materials for dissociating ammonia. Iron-based disproportionation catalysts are described as well (Georgiev 1989). However, low flow rates of ammonia and/or high catalyst temperatures are required for the disproportionation of ammonia over these metals. Another material found useful for cracking ammonia into hydrogen and nitrogen is the alloy comprising, by weight, 40.5% Zr, 24.5% Mn, and 25% by weight Fe (available commercially under the tradename St 909 from SAES Getters of Lainate, Italy) with 10% aluminum (Al) used as a binder (Baker et al. 1994).

Unfortunately, known ammonia cracking technologies are insufficient to enable the use of hydrogen fuels in ICEs. In particular, the above-described low flow rate of present ammonia cracking catalysts prevents the employment of hydrogen as a fuel either for ICEs or fuel cells. A preliminary calculation (Brabbs 1978) has shown that for hydrogen to become a real alternative to hydrocarbons as a fuel for ICEs, a flow of hydrogen of between about 100 standard liters per minute (slm) and about 200 slm to the engine is required.

Thus, it would be of great advantage to identify and develop materials capable of catalyzing the disproportionation of ammonia at rates sufficient for use in ICEs or fuel cells to access the enormous potential of hydrogen fuels as an environmentally sound energy source.

SUMMARY OF THE INVENTION

The present invention provides materials and methods that provide hydrogen from the disproportionation of ammonia in a highly efficient manner. Moreover, the materials and methods described herein can be used to produce hydrogen from ammonia at flow rates that are acceptable for the use of hydrogen in internal combustion engines. Thus, the present invention will be seen to provide an important contribution to the employment of environmentally sound energy sources.

In one aspect, the present invention provides ammonia cracking materials that are capable of producing hydrogen from ammonia at efficiencies of about 95%. In one embodiment, the ammonia cracking materials of the invention are alloys including (1) an alloy having the general formula $Zr_{1-x}Ti_xM_1M_2$, wherein $M_1$ and $M_2$ are selected independently from the group consisting of Cr, Mn, Fe, Co, and Ni, and x is between about 0.0 and about 1.0 inclusive; and (2) Al. The amount of Al in the alloy is between about 20% and about 50% by weight. In one embodiment the amount of Al in the alloy is between about 20% and about 40% by weight. In another embodiment, the amount of Al in the alloy is between about 20% and about 30% by weight. In still another embodiment, the amount of Al in the alloy is about 20% by weight.

In one embodiment, the alloys having the general formula $Zr_{1-x}Ti_xM_1M_2$ include those for which x is 0.0, i.e., alloys of general formula $ZrM_1M_2$, where $M_1$ and $M_2$ are selected independently from the group consisting of Cr, Mn, Fe, Co, and Ni. In a more specific embodiment, the alloy comprises ZrMnFe.

In a second aspect, the above-described materials are reacted with ammonia under conditions effective to produce hydrogen and nitrogen. In one embodiment, these conditions include reacting the aforementioned ammonia-cracking material with ammonia at a temperature of between about 500° C. and about 1000° C. inclusive to produce thereby hydrogen and nitrogen gases. In still another embodiment, the temperature range is between about 600° C. and about 800° C. inclusive, and more particularly, between about 600° C. and about 700° C. inclusive. In yet another embodiment the temperature employed with the materials of the invention for cracking ammonia is about 700° C.

In a third aspect, the invention relates to methods for powering hydrogen-powered internal combustion engines and fuel cells using the above-described methods and materials, and further to fuel cells and engines including the ammonia-cracking materials of the present invention. In one embodiment, the present invention provides a method for operating a hydrogen powered fuel cell in which ammonia is reacted with the materials of the invention to produce hydrogen which is then further reacted to produce an electric current. In another embodiment the materials and methods described herein are used to provide hydrogen fuel for hydrogen-burning internal combustion engines.

These and other aspects and advantages of the present invention will become more apparent when the Description below is read in conjunction with the accompanying Drawings.

DESCRIPTION OF SPECIFIC EMBODIMENTS

Figure 1:
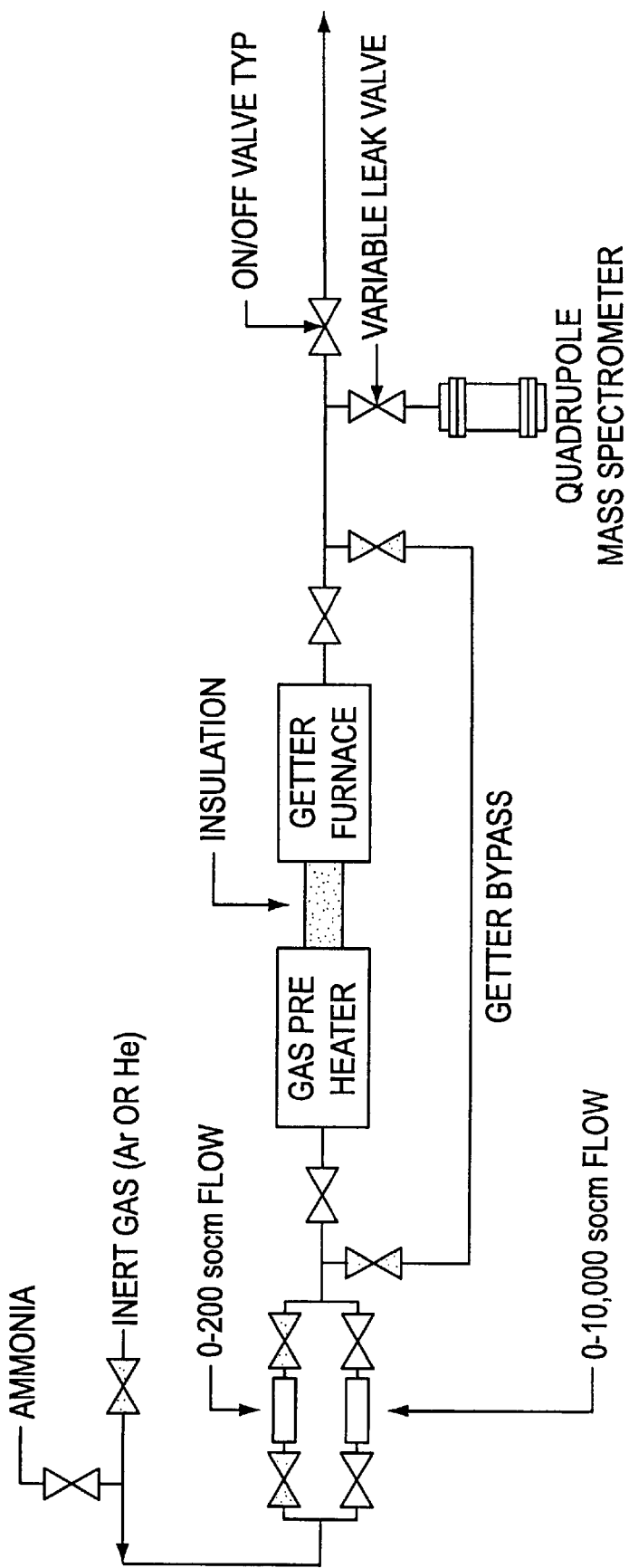
FIG. 1 is an illustration of an apparatus used to determine the cracking efficiency of the ammonia cracking materials of the present invention.

According to a first aspect, the present invention provides a method for cracking ammonia comprising contacting ammonia with an ammonia-cracking material which, in one embodiment, is an alloy including (1) alloy having the general formula $Zr_{1-x}Ti_xM_1M_2$, wherein $M_1$ and $M_2$ are selected independently from the group consisting of Cr, Mn, Fe, Co, and Ni, and x is between about 0.0 and about 1.0 inclusive; and (2) Al. The amount of Al in the alloy is between about 10% and about 50% by weight. In one embodiment the amount of Al in the alloy is between about 20% and about 40% by weight. In another embodiment, the amount of Al in the alloy is between about 20% and about 30% by weight. In still another embodiment, the amount of Al in the alloy is about 20% by weight.

In one embodiment, the alloys having the general formula $Zr_{1-x}Ti_xM_1M_2$ include those for which x is 0.0, i.e., alloys of general formula $ZrM_1M_2$, where $M_1$ and $M_2$ are selected independently from the group consisting of Cr, Mn, Fe, Co, and Ni. In a more specific embodiment, the alloy comprises ZrMnFe, which is sold commercially under the tradename ST 909 by SAES Getters S.p.A. (Milan, Italy).

The preparation of these materials is performed according to methods commonly known in the art of metallurgy, and described for example, in U.S. Pat. Nos. 4,269,624 and 5,180,568, both of which are incorporated herein by reference for all purposes. For example, the alloys can be obtained by melting lumps or chunks of the desired components in the desired weight ratio. Generally the use of lumps or chunks is preferred as this decreases the amount of surface contamination from atmospheric gases; however, small amounts of powders can be used to achieve the desired weights. Homogeneity can be improved by remelting the alloy between about two and about five times in which the ingot from the previous melt is crushed and the resulting powders are mixed before the subsequent melt. In one embodiment, the materials useful for the present invention are particulate, having an average particle size ranging between about 10 μm and about 250 μm inclusive and, in a more specific embodiment, between about 50 μm and about 200 μm inclusive. The powders are contained in a suitable chamber having porous ends so as to provide an inlet and an outlet for the gases. The materials and methods for providing such a chamber are known to those having skill in the getter material arts. In another embodiment, the powders are compressed to yield pellets. In general, the handling of pelletized materials is easier than the handling of powdered material.

In one embodiment, the alloy of the invention can be prepared by arc-melting the metal components in a purified argon (Ar) atmosphere using standard methods, such as the so-called "cold hearth technique" on a water-cooled copper substrate to provide ingots of the metal components. The ingots are remelted to achieve homogeneity. For example, useful homogeneity can be achieved by remelting the ingots at least about 4 times. The ingots are then crushed into powder using a jaw mill under an inert gas atmosphere. The powder is then sieved to obtain the desired grain size. In one embodiment, additional Al powder, e.g., between about 5% and about 10% is provided to function as a mechanical binder, and the resulting powder mixture was is compressed into pills. Other methods for obtaining the above-described alloys of the invention will be apparent to those having skill in the metallurgical arts.

The ammonia and ammonia cracking material are reacted under conditions that are effective to produce nitrogen and hydrogen from the ammonia. In one embodiment, such conditions include reacting the aforementioned ammonia-cracking material with ammonia at a temperature of between about 500° C. and about 1000° C. inclusive to produce thereby hydrogen and nitrogen gases. In one embodiment, the temperature range is between about 600° C. and about 800° C. inclusive, and more particularly, between about 600° C. and about 700° C. inclusive. In one embodiment the temperature employed with the materials of the invention for cracking ammonia is about 700° C. In another embodiment, the ammonia cracking reaction is performed at a pressure of between about 1 bar and about 5 bar. However, it will be appreciated that at high temperatures hydrogen can permeate the metal walls of pipes and dissociating unit. According to one embodiment of the present invention, the reaction of ammonia and the above-described materials is performed under conditions effective to produce a hydrogen having less than about 5% unreacted ammonia by volume. In another embodiment, the reaction conditions are such that a hydrogen flow rate of between about 100 standard liters per minute (slm) and about 200 slm is produced.

In one embodiment, the ammonia is preheated to about the same temperature of the catalyst before contacting the ammonia cracking material. Such preheating has been found to improve the efficiency of the disproportionation reaction and provide higher flow rates. In ICEs ammonia can be preheated by exploiting the heat generated by the combustion of hydrogen in the engine. In one embodiment, the exhaust manifold from the combustion chamber of the engine is placed in a counterflow configuration with the ammonia conduit so that heat released from the combustion of hydrogen can be used to preheat the ammonia gas outside of the dissociation chamber.

In another aspect, the present invention relates to methods for powering hydrogen-powered engines and fuel cells using the above-described methods and materials, and further to fuel cells and engines including the ammonia-cracking materials of the present invention. The construction of such engines and fuel cells is known to those of skill in the art. In general, any existing engine or fuel cell design that operates with hydrogen can be adapted to benefit from the methods and materials described herein by including a reaction chamber which houses the above-described ammonia cracking materials which reaction chamber includes an inlet coupled fluidly with an ammonia supply, for introducing ammonia into the reaction chamber, and an outlet coupled fluidly with the combustion or electricity generating chamber for passing the hydrogen gas product for combustion or electrochemical reaction. In some cases, a separate nitrogen exhaust can be included. Alternatively, the nitrogen can be passed along with the hydrogen into the combustion or electricity generating chamber. The construction and materials for forming the reaction chamber, ammonia storage container, and the various couplings will be familiar to those of skill in the art.

In addition, it will be appreciated that the hydrogen gas may need to be provided at a controlled flow rate for certain applications. For example, for combustion engines it has been found that a hydrogen flow rate of between about 100 standard liters per minute (slm) and about 200 slm is sufficient for useful engine performance characteristics. Furthermore, in some embodiments, a heater for heating the ammonia supply can be provided such that the ammonia fuel can be maintained in a liquid and/or gaseous state as to provide a controllable flow of ammonia into the reaction chamber. The characteristics and construction of such a heater and its employment to achieve various flow rates, will depend on various factors, including the ambient temperature under which the system is expected to operate, and will be familiar to those skill in the art.

For example, one useful hydrogen combustion engine in accordance with the present invention is based on the engines described in U.S. Pat. Nos. 4,478,177 and 4,750,453 to Valdespino, both of which are incorporated herein by reference for all purposes. In one embodiment, the engines described in aforementioned U.S. Patents are modified such that the catalysts used to crack the ammonia into its constituent nitrogen and hydrogen gases are selected from the materials described herein. It will be appreciated that the use of such engines will be especially attractive in agricultural applications (e.g., in tractors, trucks, and generators) where networks, facilities, and procedures for supplying and handling ammonia are well established.

The materials of the present invention have been found to crack ammonia with high efficiency. As described in the Examples below, comparisons of the cracking efficiency of the materials of the present invention with St 909 getter indicate that the materials described herein can achieve cracking efficiencies as great as 95% as opposed to the 75% efficiency of cracking ammonia using the alloy known as St 909. In addition, the materials of the present invention have been found to produce hydrogen flow rates of between about 100 slm and about 200 slm which are important for the effective use of hydrogen as a fuel for internal combustion engines.

EXAMPLES

The following examples describe specific aspects of the invention to illustrate the invention and aid those of skill in the art in understanding and practicing the invention. However, these examples should not be construed as limiting the invention in any manner.

Example 1

Preparation of A ZrMnFeAl Alloy

The above-described alloy was prepared by arc-melting 100 grams of 36.1 grams (g) of Zr, 21.8 g of Mn, 22.1 g of Fe, and 20.0 g of Al in a purified Ar atmosphere. This was done by the so-called "cold hearth technique" on a water cooled copper substrate. The resulting ingots of ZrMnFeAl alloy were remelted about 4 times to assure a homogeneous composition as confirmed by standard metallographic analysis. The ingots were then crushed in a jaw mill into powder under an inert gas atmosphere using standard methods. The powder was sieved to obtain a grain size of between about 88 microns and about 180 microns. An additional 10% of Al powder (by weight) was added as a mechanical binder and the resulting powder mixture was then compressed into pills of 6 mm diameter and 4 mm height.

Example 2 (Comparative)

Preparation of A ZrMnFe+10% Al Sintered Body 90 grams of St 909 were prepared by arc-melting 40.6 g of Zr, 24.5 g of Mn and 24.9 g of Fe. The resulting ingots of $Zr_1Mn_1Fe_1$ intermetallic compound were remelted 4 times to assure a homogeneous composition. The powder was sieved to obtain a grain size of between about 88 microns and about 180 microns. The powders were admixed to 10 g of Al powder of same grain size range of St 909 powders and the mixture compressed into pills of 6 mm diameter and 4 mm height.

Example 3

Determination of Ammonia Cracking Efficiency of Invention Alloys

Figure 2:
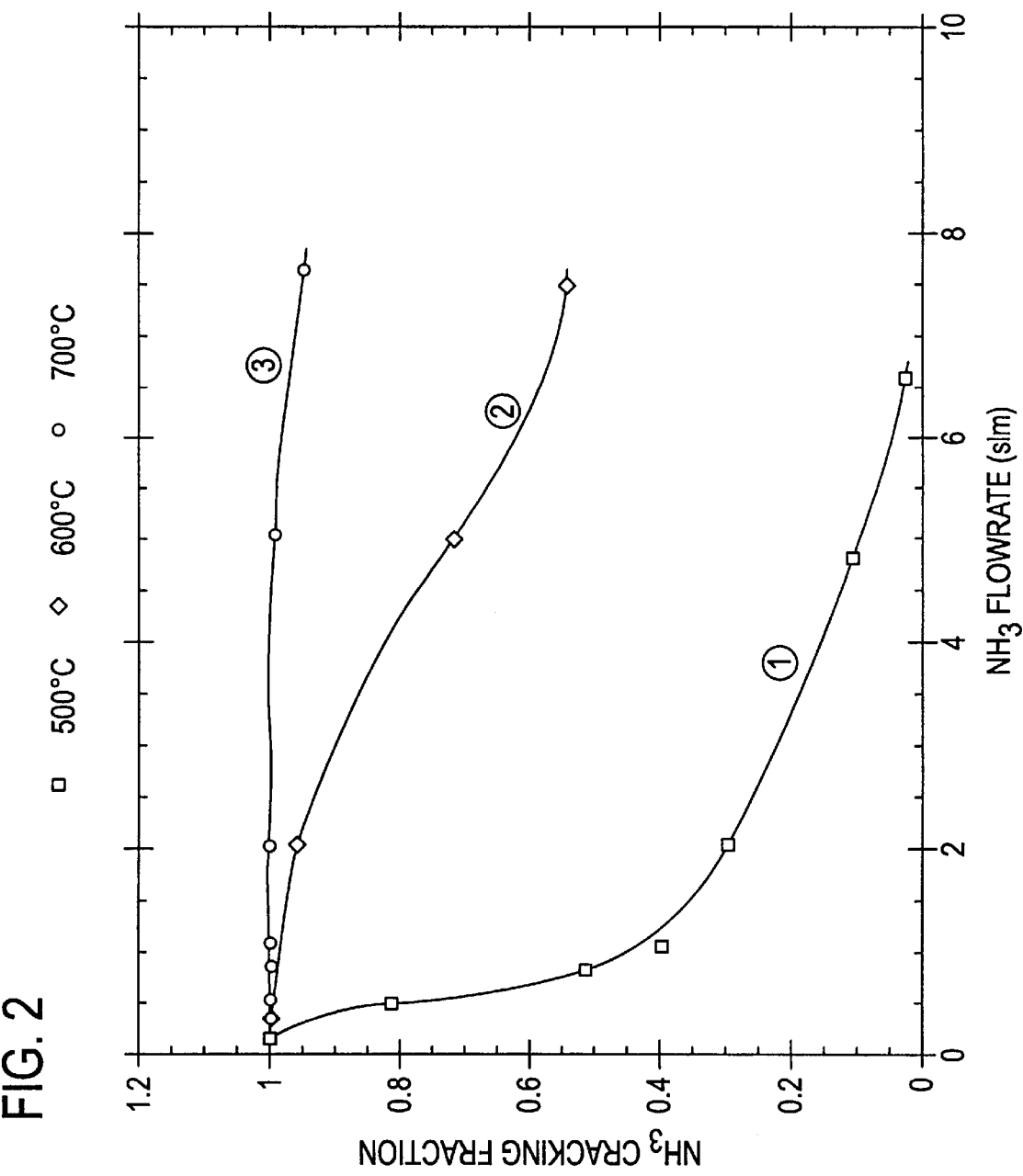
FIG. 2 illustrates the ammonia cracking efficiency vs. flow rate of an ammonia-cracking material of the invention versus St 909 at 500° C., 600° C., and 700° C.

The ammonia cracking properties of the alloy prepared as described in Example 1 above were measured using the experimental system illustrated in FIG. 1 at 100. This system included a stainless steel gas manifold 102 through which either an inert gas or the vapor from liquid ammonia was introduced to a reaction chamber 104. The gas passed through either one of two flow controllers 106 (depending upon desired flow rate range), the catalyst cartridge 108, and finally to a quadrupole mass spectrometer 10 where a small portion of the gas stream was analyzed. The aliquot of the gas to be tested was inlet to the mass spectrometer by means of a variable leak valve 112. Provision was also made for the gas to bypass the ammonia-cracking material using a shunt 114 so that the relative amount of ammonia present in the unprocessed gas stream could be measured. In all studies, the ammonia-cracking material consisted of a 40 cubic centimeter (cc) volume of material. The ammonia was preheated to the same temperature as the ammonia-cracking material. The temperature and flow rate were varied in the various experiments. Temperature was varied between about 500° C. and about 700° C.; the flow rate ranged from about 0.1 to about 10.0 standard liters per minute (slm). Data from these experiments were generated by acquiring time-sequenced mass spectra while the ammonia gas passed through the ammonia-cracking material. Three spectra were taken at each flow and temperature and averaged. By comparing the peak heights corresponding to $NH_3$, $N_2$, and $H_2$ in the gas that passed through the ammonia-cracking material to that which by passed the ammonia-cracking material through shunt 114 the cracking efficiency of the material was determined. The results of tests conducted at 500° C., 600° C. and 700° C. are reported in graph in FIG. 2, respectively as curve 1, 2 and 3.

Example 4 (Comparative)

The Ammonia Cracking Efficiency of Prior Art Materials

Figure 3:
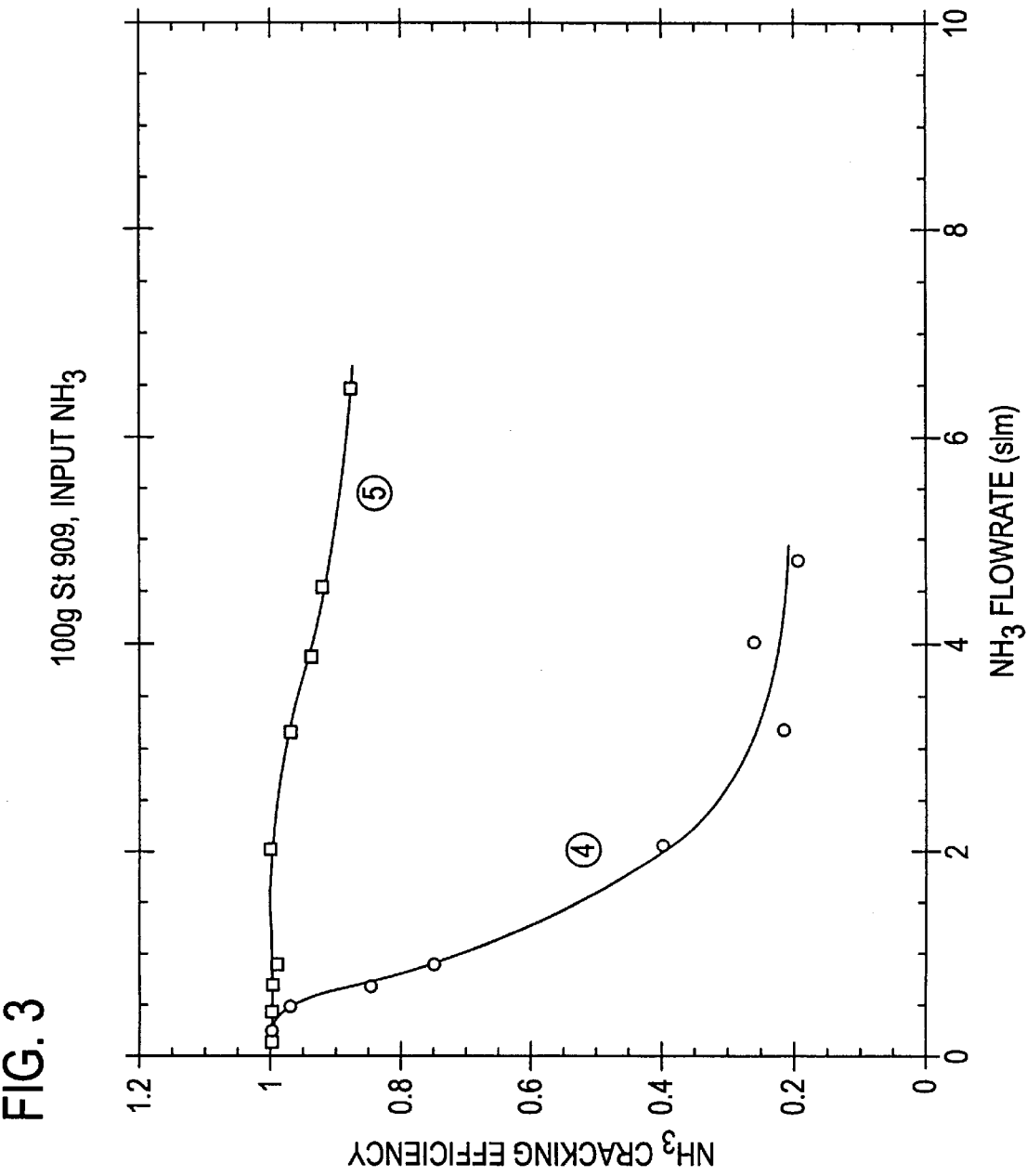
FIG. 3 illustrates the ammonia cracking efficiency vs. flow rate for St 909 and a material of the invention at 500° C.
Figure 4:
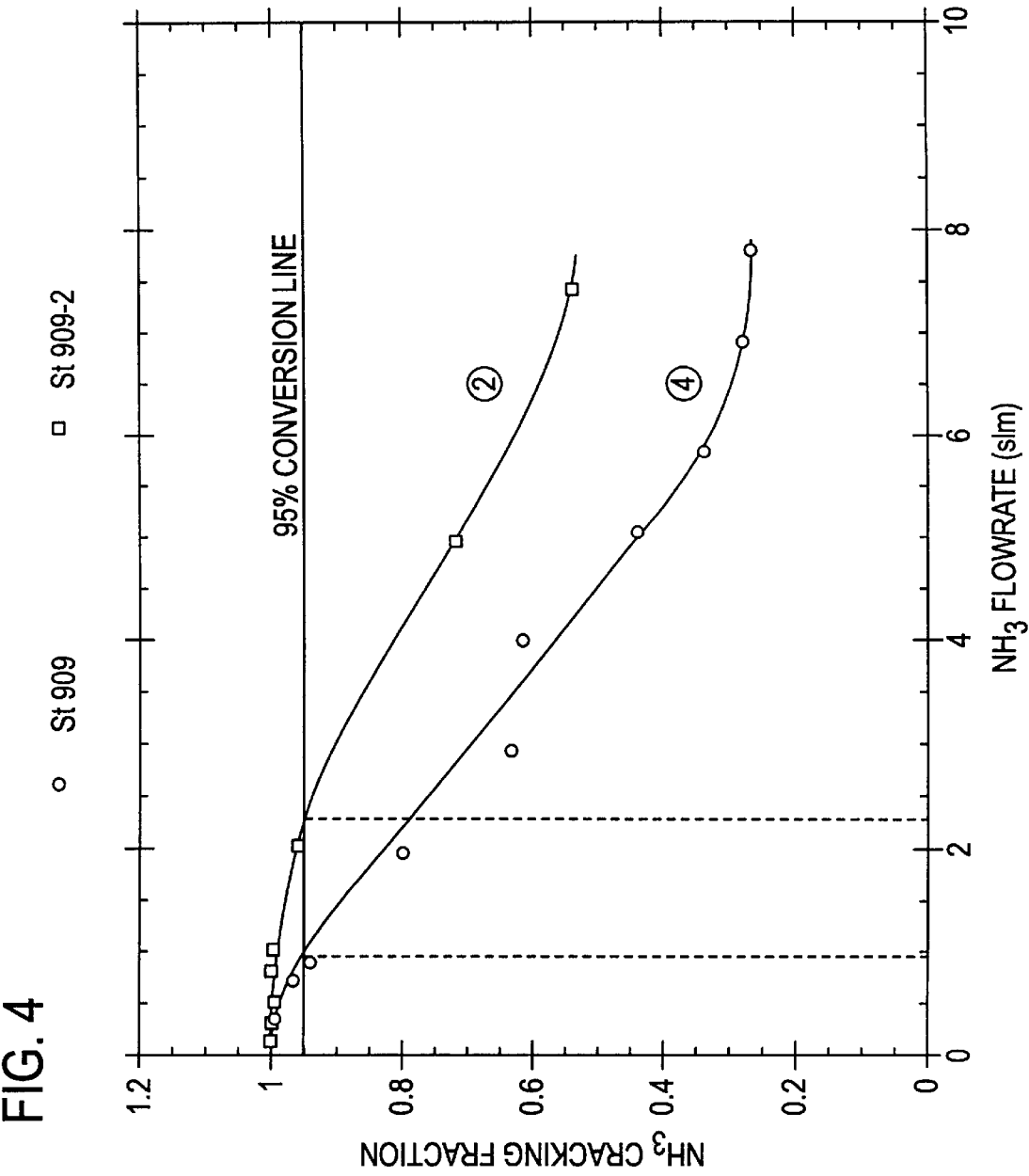
FIG. 4 illustrates the ammonia cracking efficiency vs. flow rate for St 909 and a material of the invention at 600° C.

The cracking efficiency of the material prepared as described in Example 2 was determined using the apparatus and methods described in Example 3 above. The results of the cracking experiments are shown in FIG. 3, respectively as curve 4 for the test at 600° C. and curve 5 for the test conducted at 700° C. The results of cracking at 500° C. are not given in this case due the excessively low conversion efficiency of the material at this temperature. The results of tests of Examples 3 and 4 are also reported in graph in FIGS. 4 and 5, in which curves 2–5 are repeated. In FIG. 4 the ammonia-cracking properties at 600° C. of the invention alloys (curve 2) and of prior art materials (curve 4) are compared; in FIG. 5 the ammonia-cracking properties at 700° C. of the invention alloys (curve 3) and of prior art materials (curve 5) are compared.

Figure 5:
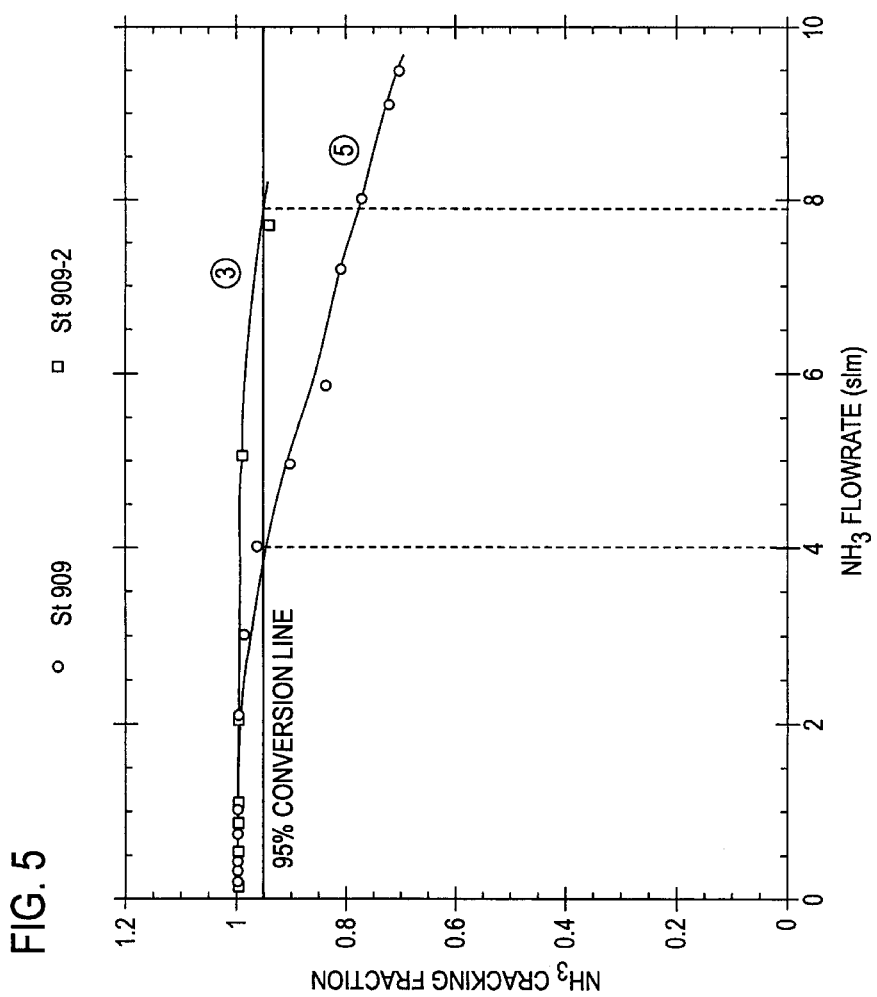
FIG. 5 illustrates the ammonia cracking efficiency vs. flow rate for St 909 and a material of the invention at 700° C.

As can be noted by the analysis of the graphs, the alloys of the invention show superior ammonia-cracking properties when compared to Al-bonded St 909. As shown in FIG. 4, at 600° C. the alloys of the invention have a higher ammonia-cracking efficiency. In particular, the alloys of the invention can crack ammonia with an efficiency of at least 95% at flow rates as great as 2 slm. Under the same conditions, the ammonia cracking efficiency of prior art materials falls below the 95% limit at a flow rate of about 1 slm; that is, about one half the flow rate afforded by the alloys of the invention. Similarly, as shown in FIG. 5, the alloys of the invention retain an ammonia-cracking efficiency over 95% up to a flow rate of about 8 slm, whereas for prior art materials this efficiency level is lost already at a flow rate of about 4 slm; again, a value that is one half of what afforded by inventive materials.

Thus, the methods and materials described herein will be seen to provide means for cracking ammonia to produce hydrogen with very high efficiency. Using these materials and methods, ammonia can be used to supply hydrogen in a safe, efficient manner. In particular, the present invention can supply efficiently hydrogen at flow rates that are acceptable for use in hydrogen-burning internal combustion engines. Thus, the methods and materials of the present invention will be seen to offer an important contribution to the development and commercial use of cleaner burning engines.

Although certain embodiments and examples have been used to describe the present invention, it will be apparent to those having skill in the art that various changes can be made to those embodiment and/or examples without departing from the scope or spirit of the present invention. For example, it will be appreciated from the foregoing that a wide variety of fuel cell and engine designs can be employed with the methods and materials described herein using techniques and materials well known to those of skill in the art. In addition, the ammonia cracking materials of the invention can be employed in a wide variety of forms such as powders and pills.

The following materials are incorporated herein by reference in their entirety for all purposes.

Baker, J. D., et al. 1994. "Tritium Purification Via Zirconium-Manganese-Iron Alloy Getter St 909 in Flow Processes". *J. Vac. Sci. Technol. A*, 12(2):548–553.

Georgiev, et al. 1989. "Properties and Structure of a Catalyst for Dissociation of Ammonia", *Poroshkovaya Metallurgiya*, 7(319):59–65.

Greenwood, N. N. and Earnshaw, A. 1984. *Chemistry of the Elements*. Pergammon.

Brabbs, T. A. 1978. "Catalytic Decomposition of Methanol for Onboard Hydrogen Generation", NASA Publication TP-1247.

What is claimed:

1. A method for cracking ammonia into hydrogen and nitrogen, comprising:

exposing an ammonia cracking catalyst to ammonia under conditions effective to produce nitrogen and hydrogen, wherein said ammonia cracking catalyst contains (1) an alloy having the general formula $Zr_{1-x}Ti_xM_1M_2$, wherein $M_1$ and $M_2$ are selected independently from the group consisting of Cr, Mn, Fe, Co, and Ni, and x is in the range from 0.0 to 1.0 inclusive, and (2) between about 20% by weight and about 50% by weight of Al.

2. The method of claim 1, further comprising the step of producing said hydrogen at a flow rate of at least 100 standard liters per minute (slm).

3. The method of claim 2, wherein said flow rate is between about 100 slm and about 200 slm.

4. The method of claim 3, wherein said hydrogen contains less than about 5% unreacted ammonia.

5. The method of claim 1, wherein said alloy is ZrFeMn.

6. The method of claim 5, further comprising the step of producing said hydrogen at a flow rate of at least 100 standard liters per minute (slm).

7. The method of claim 6, wherein said flow rate is between about 100 slm and about 200 slm.

8. The method of claim 7, wherein said hydrogen contains less than about 5% unreacted ammonia.

9. The method of claim 5, wherein said alloy comprises between about 20% and about 40% Al by weight.

10. The method of claim 9, wherein said alloy comprises between about 20% and about 30% Al by weight.

11. The method of claim 10, wherein said alloy comprises about 20% Al by weight.

12. The method of claim 11, further comprising the step of producing said hydrogen at a flow rate of at least 100 standard liters per minute (slm).

13. The method of claim 12, wherein said flow rate is between about 100 slm and about 200 slm.

14. The method of claim 1, wherein said catalyst is maintained at a temperature of between about 500° C. and about 1,000° C. inclusive.

15. The method of claim 14, wherein said catalyst is maintained at a temperature of between about 600° C. and about 800° C. inclusive.

16. The method of claim 15, wherein said catalyst is maintained at a temperature of about 700° C.

17. The method of claim 1, wherein said hydrogen contains less than about 5% unreacted ammonia.

18. A method for operating a hydrogen-fueled internal combustion engine having an ammonia storage vessel coupled with an ammonia cracking vessel, said ammonia cracking vessel being coupled with said hydrogen-fueled internal combustion engine, said method comprising:

passing said ammonia from said ammonia storage vessel into said ammonia cracking vessel, said ammonia cracking vessel containing an ammonia cracking catalyst, wherein said ammonia cracking catalyst contains (1) an alloy having the general formula $Zr_{1-x}Ti_xM_1M_2$, wherein $M_1$ and $M_2$ are selected independently from the group consisting of Cr, Mn, Fe, Co, and Ni, and x is in the range from 0.0 to 1.0 inclusive; and (2) between about 20% by weight and about 50% by weight Al to produce thereby nitrogen and hydrogen gases;

passing said hydrogen gas to said hydrogen-fueled internal combustion engine; and combusting said hydrogen gas to power said hydrogen-fueled internal combustion engine.

19. The method of claim 18, further including the step of separating said nitrogen gas from said hydrogen gas.

20. The method of claim 18, wherein said alloy is ZrFeMn.

21. The method of claim 20, wherein said alloy comprises between about 20% and about 40% Al by weight.

22. The method of claim 20, wherein said alloy comprises between about 20% and about 30% Al by weight.

23. The method of claim 22, wherein said alloy includes about 20% Al by weight.

24. The method of claim 18, further including the step of maintaining the temperature of said catalyst between about 500° C. and about 1,000° C. inclusive.

25. The method of claim 24, further including the step of maintaining the temperature of said catalyst between about 600° C. and about 800° C. inclusive.

26. The method of claim 25, further including the step of maintaining the temperature of said catalyst at about 700° C.

27. The method of claim 26, further including the step of circulating heat from said internal combustion engine to said ammonia-cracking chamber.

28. The method of claim 18, wherein said hydrogen produced according to step b) contains less than about 5% unreacted ammonia.

29. A method for operating a hydrogen fuel cell having an ammonia storage vessel coupled with an ammonia-containing ammonia cracking vessel, said ammonia cracking vessel being coupled with said hydrogen-fueled internal combustion engine, said method comprising:

passing said ammonia from said ammonia storage vessel into said ammonia cracking vessel, said ammonia cracking vessel containing an ammonia cracking catalyst, wherein said ammonia cracking catalyst contains (1) an alloy having the general formula $Zr_{1-x}Ti_xM_1M_2$, wherein $M_1$ and $M_2$ are selected independently from the group consisting of Cr, Mn, Fe, Co, and Ni, and x is in the range from 0.0 to 1.0 inclusive; and (2) between about 20% by weight and about 50% by weight Al to produce thereby nitrogen and hydrogen gases;

passing said hydrogen gas to said hydrogen fuel cell; and reacting said hydrogen in said hydrogen fuel cell to produce an electric current.

30. The method of claim 29, further including the step of separating said nitrogen gas from said hydrogen gas.

31. The method of claim 30, wherein said alloy is ZrFeMn.

32. The method of claim 33, wherein said alloy comprises between about 20% and about 40% Al by weight.

33. The method of claim 32, wherein said alloy comprises between about 20% and about 30% Al by weight.

34. The method of claim 33, wherein said alloy includes about 20% Al by weight.

35. The method of claim 33, further including the step of maintaining the temperature of said catalyst between about 500° C. and about 1,000° C. inclusive.

36. The method of claim 35, further including the step of maintaining the temperature of said catalyst between about 600° C. and about 800° C. inclusive.

37. The method of claim 36, further including the step of maintaining the temperature of said catalyst at about 700° C.

38. The method of claim 36, wherein said hydrogen produced according to step b) contains less than about 5% unreacted ammonia.

39. A hydrogen-fueled internal combustion engine, comprising:

a) an ammonia storage vessel coupled with an ammonia-cracking chamber containing an ammonia cracking catalyst, wherein said ammonia cracking catalyst contains (1) an alloy having the general formula $Zr_{1-x}Ti_xM_1M_2$, wherein $M_1$ and $M_2$ are selected independently from the group consisting of Cr, Mn, Fe, Co, and Ni, and x is in the range from 0.0 to 1.0 inclusive, and (2) between about 20% by weight and about 50% by weight Al, said ammonia storage vessel being fluidly coupled with b) an internal combustion engine effective to combust hydrogen.

40. The engine of claim 39, further comprising means for separating said nitrogen gas from said hydrogen gas.

41. The engine of claim 40, wherein said alloy is ZrFeMn.

42. The method of claim 41, wherein said alloy comprises between about 20% and about 40% Al by weight.

43. The method of claim 42, wherein said alloy comprises between about 20% and about 30% Al by weight.

44. The engine of claim 43, wherein said alloy includes about 20% Al by weight.

45. A hydrogen fuel cell, comprising:

a) an ammonia storage vessel coupled with an ammonia-cracking chamber containing an ammonia cracking catalyst, wherein said ammonia cracking catalyst contains (1) an alloy having the general formula $Zr_{1-x}Ti_xM_1M_2$, wherein $M_1$ and $M_2$ are selected independently from the group consisting of Cr, Mn, Fe, Co, and Ni, and x is in the range from 0.0 to 1.0 inclusive, and (2) between about 20% by weight and about 50% by weight Al, said ammonia-cracking chamber being fluidly coupled with b) a fuel cell effective to react hydrogen to produce thereby an electric current.

46. The fuel cell of claim 45, further comprising means for separating said nitrogen gas from said hydrogen gas.

47. The fuel cell of claim 46, wherein said alloy is ZrFeMn.

48. The fuel cell of claim 47, wherein said alloy comprises between about 20% and about 40% Al by weight.

49. The fuel cell of claim 48, wherein said alloy comprises between about 20% and about 30% Al by weight.

50. The fuel cell of claim 49, wherein said alloy includes about 20% Al by weight.

* * * * *